INVENTORS.
MARCUS H. SHELTON,
RALPH JAMES, JR.,
BY
ATTORNEY.

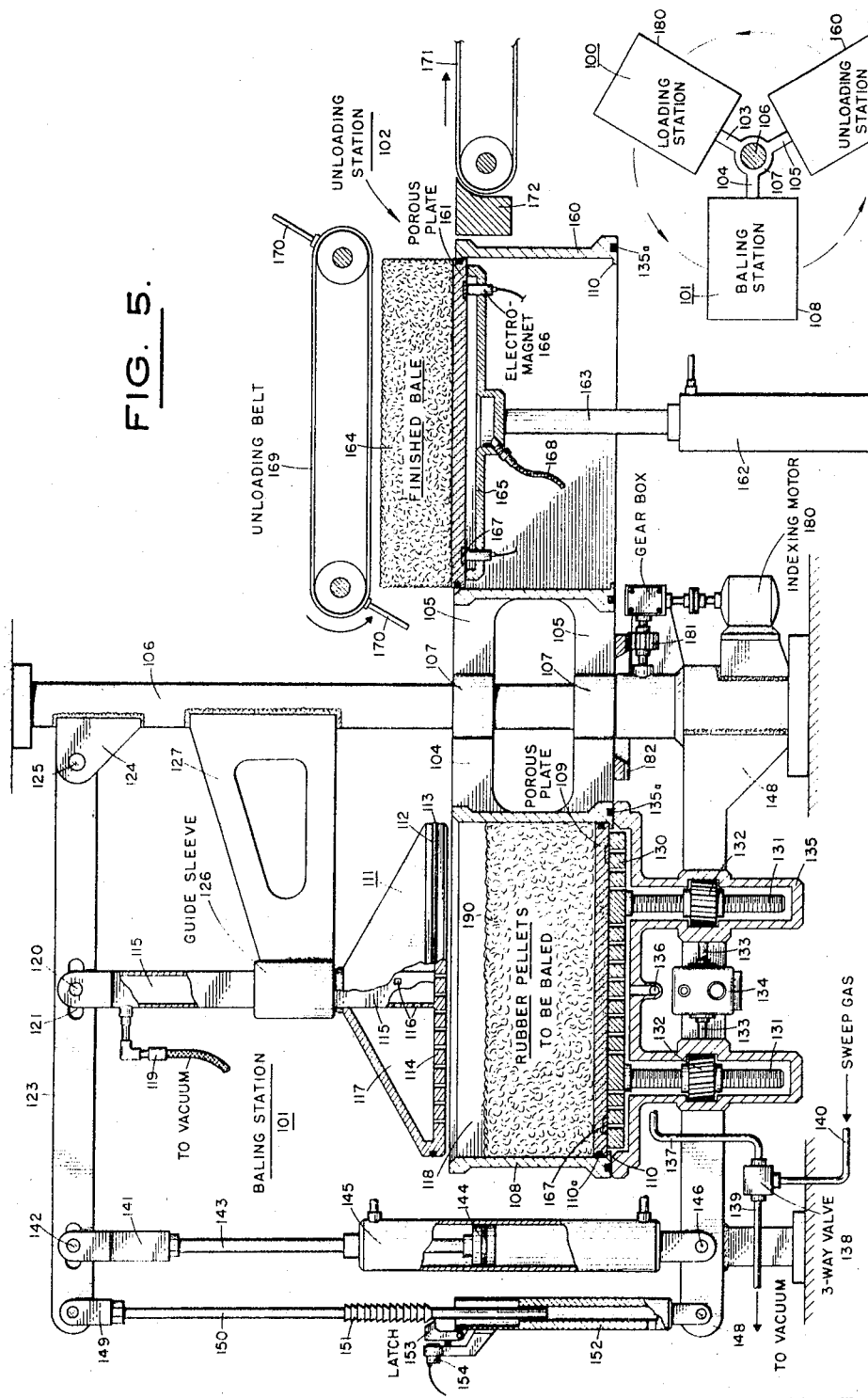

United States Patent Office 3,655,851
Patented Apr. 11, 1972

3,655,851
METHOD FOR BALING PARTICULATE SYNTHETIC ELASTOMER
Marcus H. Shelton, Baytown, and Ralph James, Jr., Channelview, Tex., assignors to Esso Research and Engineering Company
Continuation-in-part of application Ser. No. 692,436, Dec. 21, 1967. This application Mar. 19, 1970, Ser. No. 21,005
The portion of the term of the patent subsequent to Sept. 1, 1987, has been disclaimed
Int. Cl. B27h 3/00, 31/00
U.S. Cl. 264—102                                 7 Claims

ABSTRACT OF THE DISCLOSURE

A method for baling particulate synthetic elastomers such as butyl rubber and polyisobutylene. The particulate elastomer is placed in a chamber and subjected to a reduced pressure in order to remove vaporizable material and gasiform material. The elastomer is then subjected to a relatively low mechanical pressure to achieve a high density body. Densities as high as 90 to 95 percent of the maximum achievable densities for these materials are obtained and the compressed bodies show substantially no cold flow or deformity.

CROSS-REFERENCE TO RELATED APPLICATION

This application is a continuation-in-part of Ser. No. 692,436 filed Dec. 21, 1967, now Pat. No. 3,526,688, for Marcus H. Shelton and Ralph James, Jr.

BACKGROUND OF THE INVENTION

(1) Field of the invention

The present invention is directed to the baling of particulate material. More particularly, the invention is concerned with the baling of particulate synthetic elastomers such as butyl rubber, polyisobutylene, and the like. In its more specific aspects, the invention is directed to a method for baling particulate synthetic elastomers containing entrained or occluded moisture, vaporizable materials such as hydrocarbons and the like, and air or other gasiform material.

(2) Description of the prior art

It is known to bale natural and synthetic rubber by subjecting a body of the rubber particles or crumbs to mechanical pressure. It is also known to bale butyl rubber particles or crumbs and the like by application of relatively high mechanical pressure under certain conditions. Heretofore, however, it has not been known that butyl rubber and the like may be baled by using relatively low pressure since application of high pressures was necessary to produce a bale which could be shipped without substantial deformation. It has now been discovered that relatively low pressures may be used to bale particulate synthetic elastomers by subjecting a confined body of the particulate elastomer to a reduced pressure which removes moisture, volatiles, and occluded gases such as air. Heretofore, these materials, being compressible or not removed, were included in the bale and on release of pressure expanded, deforming the bale and often rupturing the bale or sometimes the container in which the bale was stored or shipped. The present invention allows baling to be accomplished at low pressures.

The following listed U.S. patents were considered with reference to this invention: U.S. 2,324,995; U.S. 3,023,-513; U.S. 3,067,462; U.S. 3,098,695; and U.S. 3,264,387.

SUMMARY OF THE INVENTION

The present invention may be briefly described and summarized as involving the baling of particulate material such as butyl rubber crumbs or particles and the like containing occluded or entrained volatile and gasiform material such as moisture, hydrocarbons, hydrocarbon derivatives, air, gases and the like in which a body of the particulate material is subjected to a reduced pressure to remove the volatile and gasiform material followed by application of mechanical pressure within the range from about 60 to about 300 pounds for a sufficient length of time to form a compressed high density body.

BRIEF DESCRIPTION OF THE DRAWING

The present invention will be further described and illustrated by the drawing in which:

FIGS. 4 and 5 illustrate apparatus for continuously automatic baling of synthetic elastomers embodying a plurality of stations.

DESCRIPTION OF THE PREFERRED MODE AND EMBODIMENT WITH RESPECT TO THE DRAWING

Figures 1, 2:
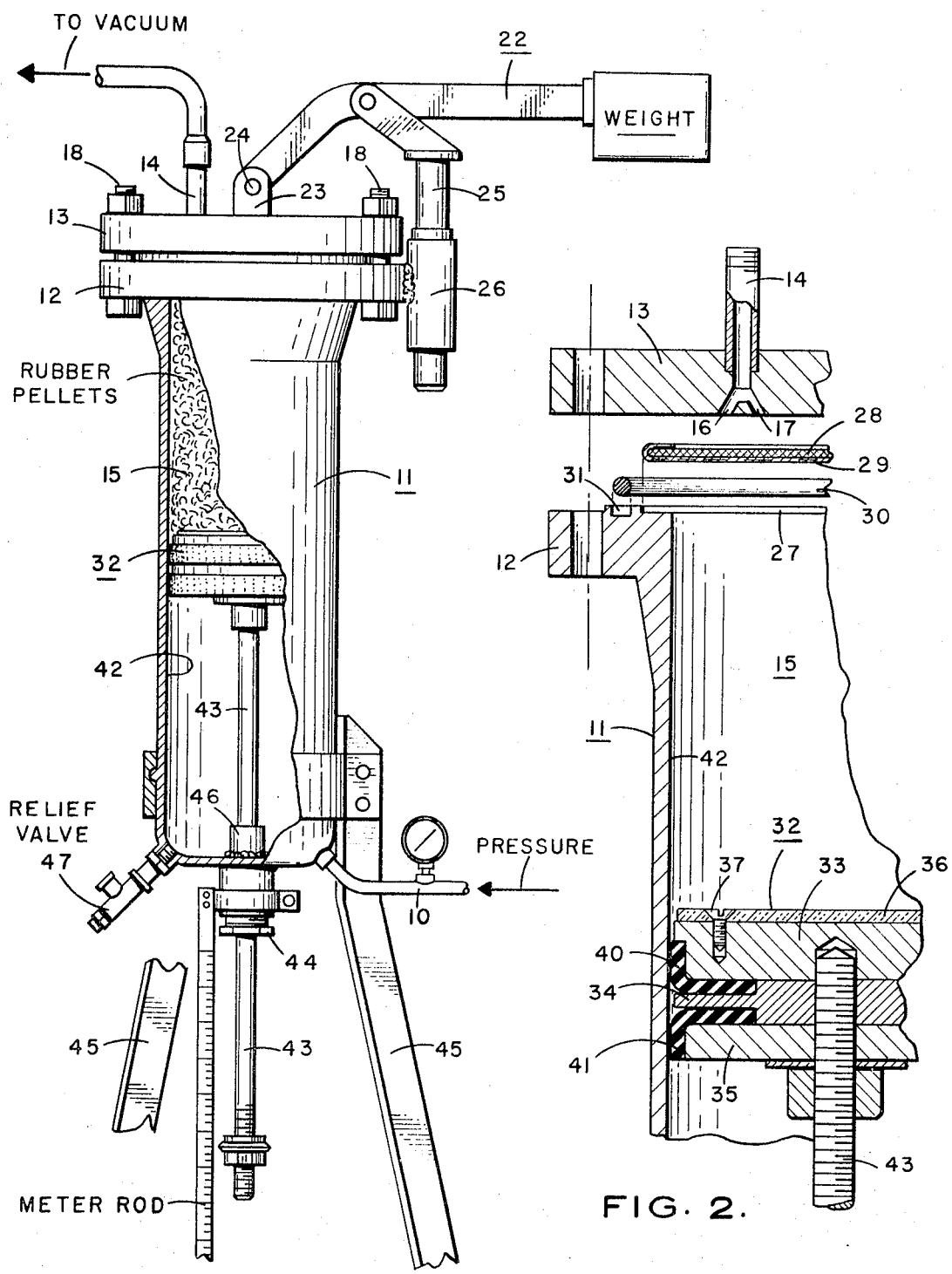
FIGS. 1 and 2 are partial sectional views of apparatus for baling synthetic elastomers.

Referring now to the drawing and particularly to FIGS. 1 and 2, numeral 11 designates a cylindrical vessel provided with a flange member 12 and a top flange member 13 which matingly engages with flange member 12 to close the vessel 11. Flange member 13 is provided with a conduit 14 which may be connected to a suitable source of reduced pressure. Conduit 14 communicates with the inner cavity 15 of the vessel 11 through passageways 16 and 17 bored in the flange member 13. The flange members 12 and 13 are matingly engaged by threaded bolts 18. Any one of several commercially available quick connecting devices could be used to secure flange 13 to flange 12. The flange member 13 is also provided with a counterbalance lifting member 22 connected to member 23 by a pin 24 for lifting the flange member 13. The lifting member 22 is connected to a davit 25 arranged in a sleeve member 26 for rotation of the davit 25 about its axis.

Arranged in a recess 27 in the flange member 12 is a stainless steel screen 28 the bottom of which is covered with a 100-mesh stainless steel, "Teflon" or polypropylene cloth 29. O-ring 30 in the O-ring groove 31 provides a seal between the flanges 12 and 13. Arranged within the cavity 15 is a piston member 32 composed of plates 33, 34 and 35. Plate 33 is covered with a sheet 36 of about ¼" thick "Teflon" or polypropylene. This sheet is held on to the plate member 33 by counter-sunk screws 37, the heads of which may be covered with cured epoxy resin. Arranged between the plate members 33 and 35 in recesses 38 and 39 formed therein are cup members 40 and 41 which provide a seal between the piston 32 and the inner wall 42 of the vessel 11.

The piston 32 is connected to threaded piston rod 43 which extends outside the vessel 11 through a packing gland or stuffing box 44 such that a pressure tight seal is effected. The lower end of vessel 11 is provided with an inlet conduit 10 for admitting pressure to the underside of piston 32. The vessel 11 is suitably supported by a plurality of supporting members such as legs 45.

The vessel 11 is provided with a suitable stop member 46 for the piston and also with a relief valve 47 which is connected into the vessel 11. This relief valve may be suitably set at 500 pounds per square inch.

In employing the apparatus in FIG. 1, the flange member 13 is removed and the inner cavity 15 is loaded with a body of particulate synthetic elastomer such as butyl rubber. The conduit 14 is connected to a source of reduced pressure and the cavity 15 containing the body of synthetic elastomer is reduced from atmospheric pressure down to 1 to 10 inches of mercury for a sufficient length of time to remove moisture and other volaties such as hydrocarbon and hydrocarbon derivatives and air. With the conduit 14 still connected to an exhaust source, pressure (through inlet conduit 10) within the range from about 60 to about 300 pounds per square inch is exerted on the body of the particulate elastomer by causing the piston rod 43 and the piston 32 to move upwardly. The compressing force on the elastomer is supplied in one instance by air pressure supplied to vessel 11 under the piston 32. This pressure is sealed from the elastomer cavity 15 by sealing member 41. This compresses the particulate elastomer into a high density compressed body for a sufficient length of time. Thereafter pressure is released and the flange 13 is removed by releasing the threaded bolts 18 and 19 and the hexagonal nuts 20 and 21. The piston 32 then is elevated to its fullest extent to push the compressed body out through the opening for recovery of same.

Figure 3:
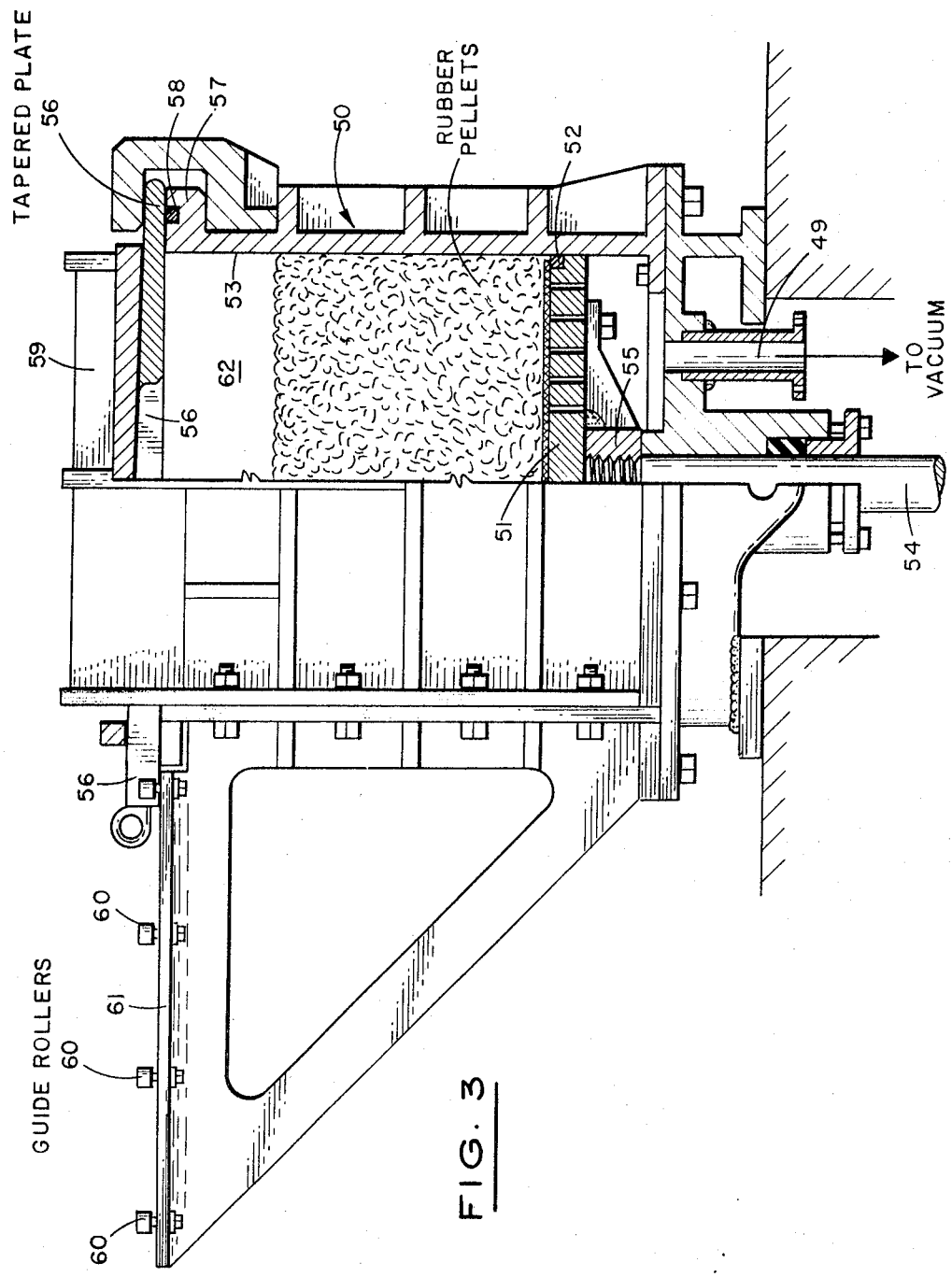
FIG. 3 is a partial cross-sectional view of another embodiment of apparatus for baling synthetic elastomers.

Referring now to FIG. 3, a rectangular baler 50 is provided with a perforated piston member 51 covered with 100-mesh stainless steel, polypropylene, or "Teflon" cloth over 16-mesh stainless steel screen. The piston member 51 is provided with a sealing member 52 which is suitably a carbon-filled "Teflon" strip to provide a seal with the inner walls 53 defined by the baler 50. The purpose of this strip 52 is to prevent elastomer from bypassing the piston member 51. The piston member 51 is connected to a piston rod 54 which is connected by member 55 to piston 51. A conduit member 49 connects into baler 50 and suitably connected by means not shown to a source of reduced pressure.

The upper end of the baler 50 is closed by tapered door 56 which is sealed to a rim member 57 by an O-ring 58. A closure member 59 holds the tapered door 56 in place. The tapered door 56 is moved horizontally from sealing engagement on guide rollers 60 which allow the tapered door to move from closing position as shown in the drawing to the left along the slide way 61 to open position.

The apparatus of FIG. 3 operates similarly to FIG. 1 with the exception that the reduced pressure connection is in the bottom of the baler 50. In this embodiment, with the tapered door 56 open, the inner cavity 62 may be substantially filled with particulate elastomer such as butyl rubber or polyisobutylene and then the tapered door closed and sealed. Reduced pressure is imposed on the body of particulate material through conduit member 49 and thereafter mechanical pressure is imposed on the body to substantially free it of moisture and gasiform material by causing the piston 51 to move upwardly in the cavity 62. After the body of particulate material has been compressed, the tapered door may be opened and the compressed high density body removed by causing the piston 51 to move upwardly a sufficient distance to force the compressed body out. Under certain process conditions, it may be desirable to flow a dry sweep gas upward through perforated piston member 51 while the elastomer particles are being loaded. This procedure would help to displace saturated vapor, and thereby aid the vacuum system in freeing the elastomer particles of volatiles.

Referring to FIGS. 4 and 5, apparatus for continuous automatic operation is provided comprised of a plurality of stations 100, 101, and 102 which are designated respectively as loading, baling, and unloading stations. Each station has positioned therein respectively rectangular wall members 180, 108, and 160 which are rotatably mounted about a center axial vertical shaft 106 by bracket means 103, 104, and 105, and bearing sleeves or rings 107. The wall members and the stations are so positioned about the shaft 106 whereby each of the wall members can alternately be rotated step-wise and be positioned in each of the stations.

The station 101 has positioned therein as shown in FIGS. 4 and 5, a rectangular wall member 108 and a porous plate 109 which rests on a shoulder 110 carried by the wall member 108. A seal member 110a provides a seal with wall member 108. The upper end of the station 101 is closed by a closure member 111 provided with a recess 112 in which is arranged a sealing member 113. The closure member 111 is provided with a porous plate member 114 which is mounted on a hollow shaft 115 having exits 116 communicating with the space 117 and through the perforated plate member 114 with the cavity 118. The hollow shaft 115 has a lateral conduit 119 connecting thereto and by means not shown to a source of reduced pressure. The upper end of hollow shaft 115 is connected to horizontal arm 123 by means of pivot pin 120 slidably arranged in slot 121 of the arm. As can be seen, arm 123 is pivotally connected to vertical shaft 106 by means of pin 125 and bracket 124. The closure member 111 with shaft 115 is slidably arranged for vertical movement in guide sleeve 126 which in turn is held in a fixed position by bracket 127 connected to shaft 106.

Arranged below the porous plate 109, separate therefrom, is a perforated plate 130 which is connected to threaded shafts 131 provided with rotating thread engaging gear members 132 which in turn are connected through worm gears not shown and shafts 133 to a high torque braked reversing motor 134 which may be suitably powered with electricity or air. The threaded shafts 131 are suitably housed in housing member 135, the shafts 133 extending into the housing 135 through suitable packing glands or the like. Housing member 135 is sealed by seal member 135a in wall member 108.

Connected to the cavity 118 through perforated plate 130 and porous plate 109 is a passageway 136 connecting to line 137 which in turn connects to a three-way valve 138 which connects by line 139 to a source of reduced pressure and by line 140 to a source of sweep gas.

The arm 123 is connected by connecting link member 141 and pin 142 to a piston rod 143 which in turn connects with a piston 144 in piston cylinder 145. Piston cylinder 145 is connected through link member 146 to a fixed bar 148 which is attached to the shaft 106.

The arm 123 is connected by link 149 to rod 150 provided with a latching means 151. The lower end of the rod 150 is arranged within a guide cylinder 152 which has pivotally attached thereto a latching mechanism such as latching dogs 153. An electro-magnetic release member 154 is provided for releasing latching dogs 153 as desired.

The station 102 is defined by wall members 160 which are similar to wall members 108 and similar thereto is provided with a porous plate 161. This porous plate may be elevated from the wall members 160 by means of a hydraulic mechanism 162 provided with a hydraulically actuated member 163. After the bale 164 has been formed, it is released from the station 102 by raising hydraulically actuated member 163 which lifts the porous plate 161 and the bale 164 by means 165 to the position shown. The member 165 has connected to it an air hose 168 for the purpose of releasing the bale such as 164 from the porous plate 161, as the vacuum created in station 101 may cause the bale to adhere to the porous plate. Electromagnets 166 hold the porous plate 161 in place during the raising and lowering operation through metallic members 167 embedded in plate 161. With the bale 164 in position as shown, the continuously rotating unloading belt 169 provided with members 170 shoves the bale 164 on to a continuously rotating conveyor belt 171 and thence to a wrapping or packaging station not shown. A member 172 may bridge the space between station 102 and the conveyor belt 171.

The station 100 (not shown in FIG. 5) has a wall member identical to the members 108 and 160 positioned therein which is loaded with pelletized or crumb butyl rubber or polyisobutylene, known to the trade as Vistanex. Thereafter, the wall member in station 100 is rotated by indexing motor 180, connecting mechanism 181 and 182, to station 101. The closure member 111 at station 101 is activated and the 3-way valve 138 may be opened to allow sweep gas such as air or hydrocarbon, as may be desired, to sweep through the body 190 of particulate elastomer with the sweep gas exiting through exits 116 and lateral conduit 119. Alternately, provisions can be made to inject sweep gas at the loading station 100 during the fill cycle at station 100. In this case, the sweep gas could discharge to a vent hood around the filling spout. Thereafter, the valve 138 is connected to the vacuum system through conduit 139 and the lateral conduit 119 also is connected to the vacuum system. This allows moisture and volatiles not removed by the sweep gas and air to be removed from the body 190. Thereafter, the fast-acting hydraulic or pneumatic apparatus comprised of piston cylinder 152 and piston rod 150, latching member 151 and latching dogs 153, is actuated to apply initial pressure to the body 190.

After initial pressure has been applied, the threaded rods 131 and members 132 which form screw jacks are actuated through motor 134 to apply terminal pressure to the body 190, which results in the formation of bale 164. After formation of the bale, plate 130 and member 111 are retracted by way of cylinder 145 and motor 134, leaving the bale in container 108 supported by plate 109. The bale is then rotated to the unloading station and unloaded as has been described.

In accordance with the present invention, the baling cavity is reduced in pressure prior to the application of mechanical pressure to form the particulate elastomer into the desired shape which may be cylindrical, rectangular, or any shape as may be expedient or desired. While not essential, a sweep gas may be introduced prior to evacuation to assist in flashing off volatile matter.

In accordance with the present invention, butyl rubber particles or crumbs may be subjected to radio frequency drying to flash residual water without heating the elastomer to any significant degree. This permits substantial drying without breakdown of the elastomer which may be experienced during drying by mechanical mechanism. By a preliminary step of drying crumb or particulate rubber and the like may be baled directly in a vaccum baler as described with high quality rubber of fine appearance.

In baling particulate synthetic elastomers in accordance with the present invention, a reduced pressure within the range from about 0.5 to about 29 inches absolute of mercury may be employed. A preferred range is from about 1 to about 10 inches absolute of mercury with a narrower range of about 3 to about 5 inches absolute of mercury being desirable.

The mechanical pressure may suitably range from about 60 to about 300 pounds per square inch, with about 100 to about 200 pounds per square inch preferred.

The mechanical pressure may be applied over a period of time ranging from about 5 to about 30 seconds. This results in a high density compressed body or bale having a very low moisture content and having a high quality appearance. In fact, in accordance with the present invention, it is possible to produce bales or compressed bodies of synthetic elastomers having a glassy appearance.

In practising the present invention, the required weight or amount of elastomer particles is dropped into the baler cavity at a temperature which may range from about 70° to 200° F. Preferably the temperature may range from about 150° to about 195° F. with the cover of the baler open and the ram lowered. The pellets are arranged on a vertically operated ram preferably having a top surface ventilated into a pressure-tight lower cavity by means of a screen or grid. A dry-warm sweep gas may be introduced either prior to or following the closing of the cover. This sweep gas may be air or a low molecular weight hydrocarbon such as methane, ethane, propane, butane, and the like. With the baler closed, the cavities above and below the ram or piston are subjected to reduced pressure within the range given which may suitably be applied through the lower cavity but which may be applied through both the upper and lower cavities or through the upper cavity. At prevailing ambient temperature, surface moisture is flashed from the pellets and is removed from the vacuum system and out along with the air and other superficial volatiles which may be hydrocarbons or hydrocarbon derivatives employed in the manufacture of the synthetic elastomers. At 160° F. synthetic elastomer temperature, moisture may be removed at 20 inches absolute of mercury. The moisture and volatiles may be entrained in or included with the elastomer particles. Simultaneously, the ram or piston is moving upward powered by hydraulic or mechanically motivated shaft operating through a packing gland. In the lowered pressure, the pellets are mutually distorted until they completely conform one to the other in the confined shape at relative low ram pressure. In many types of elastomers this pressure may be of the order of about 80 to 120 p.s.i. With no discernable or significant delay or dwell time, the particles adhere together in their variously distorted conforming shapes. When the ram pressure is removed, a dense body has been formed. In accordance with the present invention, cold flow of the elastomer is delayed and sometimes completely prevented. With the baling cavity opened, the baled or compressed body is smaller than the baler cavity and is usually concave on top or on bottom and may be pebbled only on outer surfaces where particle to particle adhesion is restricted by cavity walls. The resulting bodies or bales do not de-gas and all particles are firmly adhered to each other resulting in a bale of low moisture content. For example, the moisture content of the finished bale is within the range from about .05 to about .15 percent with normal moisture in the feed material, and has a density of about 90 to 95 percent of the maximum density achievable which is about 58 pounds per cubic foot. However, where desirable because of subsequent manufacturing operations, the density may be decreased by reducing vacuum and/or mechanical pressure to produce a porous bale which will not disintegrate under normal handling.

The present invention has been successfully used in baling or compressing particles of butyl rubber and Vistanex. These bales do not de-gas or deform appreciably on storage and shipping.

ADVANTAGES OF THE PRESENT INVENTION

The present invention allows the formation of bales or compressed bodies of synthetic elastomers which are dense, dry and uniform in appearance. Onset of cold flow, if any, is substantially delayed. The high density bale produced in accordance with the present invention contracts from atmospheric pressure when released from the baler. The bales produced in accordance with the present invention do not de-gas since air and volatiles are not trapped in the bales. The pressures employed are relatively low as compared to the relatively high pressures employed heretofore.

The bales produced in accordance with the present invention do not degrade like the prior art bales even though the bales may have some porosity. Furthermore, they do not fall apart or disintegrate during packaging and handling. The present invention is, therefore, quite important and useful.

The nature and objects of the present invention having been completely described and illustrated and the best mode and embodiment contemplated set forth what we wish to claim as new and useful and secure by Letters Patent is:

1. A method for baling particulate synthetic elastomer which contains at least one vaporizable material and gasiform material and tends to deform on compression which comprises:

subjecting a confined body of said particulate synthetic elastomer in a baling zone only to a reduced pressure within the range from about 0.5 to about 29 inches of mercury absolute sufficient to remove substantially said vaporizable and gasiform material; and then subjecting said body substantially freed of vaporizable and gasiform material in said zone to relatively low mechanical pressure within the range from about 60 to about 300 p.s.i. for a sufficient length of dwell time within the range from about 5 to about 30 seconds to form without significant delay a compressed high density body of said synthetic elastomer substantially free of cold flow or deformity.

2. A method in accordance with claim 1 in which:
(a) the synthetic elastomer is butyl rubber which contains at least one vaporizable material;
(b) the reduced pressure is within the range from about 1 to about 10 inches of mercury absolute; and
(c) the mechanical pressure is within the range from about 100 to about 200 pounds per square inch.

3. A method in accordance with claim 1 in which the synthetic elastomer is butyl rubber.

4. A method in accordance with claim 1 in which the synthetic elastomer is polyisobutylene.

5. A method in accordance with claim 1 in which the confined body is swept with a gasiform material to remove vaporizable material prior to subjecting the confined body to reduced pressure.

6. A method in accordance with claim 1 in which the reduced pressure is within the range from about 3 to about 5 inches of mercury absolute.

7. A method in accordance with claim 1 in which the confined body of synthetic elastomer is at a temperature of about 150° to about 195° F.

References Cited
UNITED STATES PATENTS 3,526,688   9/1970   Shelton et al. _____ 264—102

ROBERT F. WHITE, Primary Examiner

J. H. SILBAUGH, Assistant Examiner

U.S. Cl. X.R.

18—16 H; 264—123, 344